United States Patent
Hishida et al.

[19]

[11] Patent Number: 5,808,705
[45] Date of Patent: Sep. 15, 1998

[54] LIQUID CRYSTAL DISPLAY APPARATUS WITH TWO VIEWING ANGLE MODES AND DRIVE ELECTRODES FOR MODE DEPENDENT SELECTION

[75] Inventors: Tadanori Hishida, Kashihara; Kazuo Okamura, Osaka; Takeshi Matsukawa, Tenri, all of Japan

[73] Assignee: Sharp Kabushiki Kaisha, Osaka, Japan

[21] Appl. No.: 665,804

[22] Filed: Jun. 18, 1996

[30] Foreign Application Priority Data

Jun. 22, 1995 [JP] Japan .................................. 7-156565

[51] Int. Cl.⁶ ........................ G02F 1/1337; G02F 1/133
[52] U.S. Cl. .......................... 349/33; 349/129; 349/139
[58] Field of Search .............................. 349/33, 129, 139

[56] References Cited

U.S. PATENT DOCUMENTS

| 5,638,201 | 6/1997 | Bos et al. | 349/129 |
| 5,652,637 | 7/1997 | Hirata et al. | 349/129 |
| 5,666,178 | 9/1997 | Hirata et al. | 349/129 |

FOREIGN PATENT DOCUMENTS

| 3-126072 | 5/1991 | Japan . |
| 4-7627 | 1/1992 | Japan . |
| 6-59287 | 3/1994 | Japan . |

*Primary Examiner*—William L. Sikes
*Assistant Examiner*—Kenneth Parker
*Attorney, Agent, or Firm*—Nixon & Vanderhye P.C.

[57] ABSTRACT

A liquid crystal display apparatus for conducting display in at least two types of display mode using a plurality of pixels arranged in columns and rows, includes: an active matrix substrate having a plurality of pixel electrodes arranged in a matrix formed thereon; a counter substrate opposed to the active matrix substrate, the counter substrate having a first electrode means and a second electrode means; and a liquid crystal layer which is interposed the active matrix substrate and the counter substrate and includes a plurality of liquid crystal regions. The liquid crystal regions have viewing directions different from each other, the viewing directions being determined in accordance with orientations of liquid crystal molecules in the center of the respective liquid crystal regions. At least one of the first electrode means and the second electrode means, which is selected depending on the types of display mode, is used for selectively applying a voltage to the liquid crystal layer together with the pixel electrodes.

11 Claims, 7 Drawing Sheets

LIQUID CRYSTAL DISPLAY APPARATUS WITH TWO VIEWING ANGLE MODES AND DRIVE ELECTRODES FOR MODE DEPENDENT SELECTION

BACKGROUND OF THE INVENTION

1. Field of the Invention

The present invention relates to a liquid crystal display apparatus for image display. More specifically, the present invention relates to a liquid crystal display apparatus in which the display mode can be selectively switched between a wide viewing angle mode and a narrow viewing angle mode.

2. Description of the Related Art

Examples of methods for driving pixels arranged in the matrix of a liquid crystal display apparatus include an active matrix driving method using switching elements and a simple matrix driving method using no switching elements.

In recent years, a liquid crystal display apparatus employing an active matrix driving method using thin-film transistors for switching elements has been positively developed. The liquid crystal display apparatus using an active matrix driving method exhibits high contrast regardless of the number of scanning electrodes, as compared with those employing a simple matrix driving method and using no switching elements. In addition, when using an active matrix driving method, a clear image can be obtained even in a high-capacity apparatus having a high resolution.

Among the display modes for the active-matrix type liquid crystal display apparatus such as that described above, the TN mode is widely used, In a TN mode liquid crystal display apparatus, liquid crystal molecules in a liquid crystal layer sandwiched between a pair of substrates are oriented so that light passing through the liquid crystal layer in a direction parallel to the long axes of the liquid crystal molecules located in the center of the liquid crystal layer exhibit retardation smaller than that of the light passing through the liquid crystal layer in the direction perpendicular to the substrates. Consequently, the optimal viewing angle is that angle where the screen is seen from a direction upwardly or downwardly inclined from the direction perpendicular to the substrates by several degrees.

Figure 10:
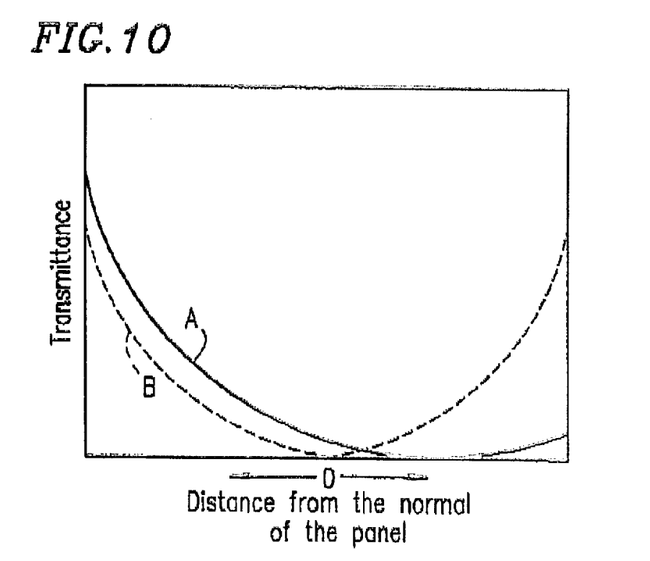
FIG. 10 is a graph illustrating the viewing angle properties of a conventional liquid crystal display apparatus (curve A) and a liquid crystal display apparatus according to the present invention (curve B).

FIG. 10 is a graph illustrating the viewing angle properties of a conventional liquid crystal panel (curve A). The horizontal axis indicates the distance from the normal of the panel to the viewing point, The point 0 indicates that the viewing point is present on the normal of the panel. The vertical axis indicates the transmittance. As can be understood by curve A in FIG. 10, in the actual liquid crystal panel, the achieved viewing angle property from moving the viewing point upwardly or downwardly with respect to the normal of the panel is significantly asymmetrical. Accordingly, the liquid crystal panel has a narrow viewing angle. In FIG. 10, line B indicates the viewing angle property of the liquid crystal panel designed with the purpose of obtaining a wider viewing angle which will be described later.

Several methods for switching between viewing angle modes have been suggested in Japanese Laid-Open Patent Publications No. 3-126072 and No. 4-7627. In these methods, the display mode is switched between the wide viewing angle mode and the narrow viewing angle mode by switching a voltage effectively applied to the liquid crystal layer in the liquid crystal panel between a larger level and a smaller level. Specifically, when the liquid crystal display panel is set to a narrow viewing angle mode, the voltage applied to the liquid crystal layer is decreased. On the other hand, when the liquid crystal display panel is set to a wide viewing angle mode, the voltage applied to the liquid crystal layer is increased. In this manner, the magnitude of twist of the orientations of the liquid crystal molecules is changed, thereby changing the display mode.

In the methods described above, there is no problem when the larger voltage is applied to the liquid crystal layer, because an excellent contrast is exhibited on the display screen. However, when a smaller voltage is applied to the liquid crystal layer, poor contrast is exhibited on the display screen resulting in unsatisfactory display performance.

Moreover, in the above-described methods, the liquid crystal panel is designed without the purpose of obtaining a wide viewing angle. Accordingly, even in the wide viewing angle mode, such a liquid crystal panel does not provide a wide viewing angle range, but rather only provides a viewing angle range substantially equal to that provided by a normal liquid crystal panel. It is very inconvenient when such a liquid crystal display apparatus is seen by many people together.

Furthermore, in the narrow viewing angle mode, it is necessary to decrease the effective voltage applied to the liquid crystal layer. This makes the contrast on the liquid crystal panel poor. That is, since the normally designed liquid crystal panel is used, the display mode of the liquid crystal display apparatus is switched only by changing the degree of the twist of the orientations of the liquid crystal molecules. Specifically, when the liquid crystal apparatus is set to the narrow viewing angle mode, the voltage applied to the liquid crystal layer is decreased. On the other hand, when the liquid crystal display apparatus is set to the wide viewing angle mode, the voltage applied to the liquid crystal layer is increased.

SUMMARY OF THE INVENTION

According to one aspect of the present invention, a liquid crystal display apparatus for conducting display in at least two types of display modes using a plurality of pixels arranged in columns and rows, includes an active matrix substrate having a plurality of pixel electrodes arranged in a matrix formed thereon; a counter substrate opposed to the active matrix substrate, the counter substrate having a first electrode means and a second electrode means; and a liquid crystal layer interposed the active matrix substrate and the counter substrate, the liquid crystal layer including a plurality of liquid crystal regions, wherein the liquid crystal regions have viewing directions different from each other, the viewing directions being determined in accordance with orientations of liquid crystal molecules in the center of the respective liquid crystal regions along the thickness direction, and wherein at least one of the first electrode means and the second electrode means, which is selected depending on the types of display mode, is used for selectively applying a voltage to the liquid crystal layer together with the pixel electrodes.

In one embodiment of the present invention, the first electrode means and the second electrode means are formed of a transparent conductive film to have different shapes from each other, while being insulated from each other.

In another embodiment of the present invention, the first electrode means includes a uniform electrode formed at least over a region of the counter substrate which corresponds to a region where the pixels are arranged, and the second electrode means includes a plurality of strip-shaped electrodes. Each of the plurality of strip-shaped electrodes has a width equal to or smaller than the width of each of the pixel electrodes.

In still another embodiment of the present invention, the liquid crystal display apparatus further includes a switching means for selecting either one of the first electrode means and the second electrode means so that the voltage is applied only to the selected one.

In still another embodiment of the present invention, the liquid crystal display apparatus further includes a switching means for switching between two states, one of the two states being a state in which the voltage is applied only to the first electrode means, the other of the two states being a state in which the voltage is applied both to the first electrode means and the second electrode means.

In still another embodiment of the present invention, the first electrode means includes a plurality of first strip-shaped electrodes, and the second electrode means includes a plurality of second strip-shaped electrodes. The first and second strip-shaped electrodes extend along the columns of the pixels. At least one of the first strip-shaped electrodes and at least one of the second strip-shaped electrodes are arranged to correspond to each of the columns of the pixels.

In still another embodiment of the present invention, each of the first strip-shaped electrodes is disposed to be sandwiched by two of the second strip-shaped electrodes, each of the first strip-shaped electrodes and the two second strip-shared electrodes being arranged to correspond to at least one of the columns of the pixels.

In still another embodiment of the present invention, both of the second strip-shaped electrodes sandwiching each of the first strip-shared electrodes have the same size, and are formed of a transparent conductive material.

In still another embodiment of the present invention, the liquid crystal display apparatus further includes a first alignment film formed on one of the active matrix substrate and the counter substrate and a second alignment film formed on the other substrate. The first alignment film provides a first pretilt angle for liquid crystal molecules which are adjacent the first alignment film. The second alignment film provides liquid crystal molecules which are adjacent the second alignment film with a second pretilt angle in at least one of the liquid crystal regions and with a third pretilt angle in the other of the liquid crystal regions, the second pretilt angle being larger than the first pretilt angle, the third pretilt angle being smaller than the first pretilt angle.

In still another embodiment of the present invention, the liquid crystal display apparatus further includes a first alignment film formed on one of the active matrix substrate or the counter substrate and a second alignment film formed on the other substrate. Each of the first alignment film end the second alignment film includes a first portion for a larger pretilt angle and a second portion for a smaller pretilt angle. The active matrix substrate and the counter substrate are arranged so that the first portion of the first alignment film opposes the second portion of the second alignment film and the second portion of the first alignment film opposes the first portion of the second alignment film.

In still another embodiment of the present invention, each of the pixels includes more than one of the liquid crystal regions to have more than one different viewing direction.

In the present invention, the liquid crystal molecules in the liquid crystal layer are oriented so that a wide viewing angle can be provided. The pattern and arrangement of the electrodes provided on the counter substrate are designed as follows: two kinds of electrodes having different shapes from each other or three strip-shaped electrodes are used.

By selectively using the above-mentioned electrodes, it becomes possible to select the display mode of the liquid crystal display panel between the wide viewing angle mode and the narrow viewing angle mode depending on the use of the liquid crystal display apparatus. In this case, since the liquid crystal molecules in the liquid crystal layer are oriented so that a wide viewing angle can be provided, the degradation of the contrast is suppressed. Obviously, when the wide viewing angle mode is selected, a wider viewing angle property can be obtained.

Accordingly, when the liquid crystal display apparatus is used to display private information, or display and input information or data desired not to be seen by others, and the like, the display mode is switched into the narrow viewing angle mode. On the contrary, when the liquid crystal display apparatus is used for a normal application or when the display screen is seen by a plurality of persons together, the display mode is switched into the wide viewing angle mode.

Thus, the invention described herein makes possible the advantage of providing a liquid crystal display apparatus in which the display mode can be switched between the wide viewing angle mode which provides a wider viewing angle and the narrow viewing angle mode which provides excellent contrast.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of illustrative examples.

EXAMPLE 1

Figure 1:
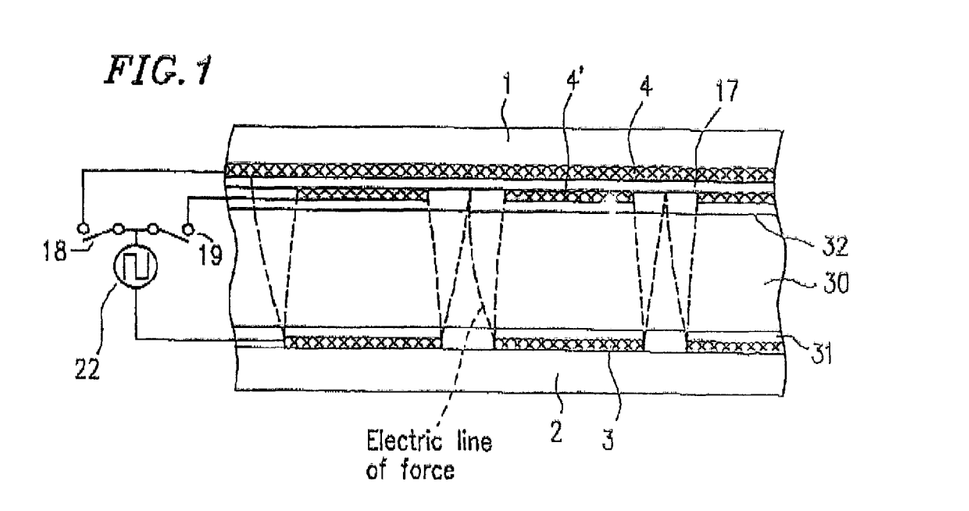
FIG. 1 is a cross-sectional view showing a liquid crystal display apparatus according to Example 1 of the present invention.

FIG. 1 is a cross-sectional view showing a liquid crystal display apparatus according to Example 1 of the present invention.

In the liquid crystal display apparatus of the present example, an active matrix substrate 2 and a counter substrate 1 are disposed, and a liquid crystal layer 30 is interposed therebetween. The active matrix substrate 2 includes pixel electrodes 3 provided in a matrix, gate lines (not shown) used as scanning lines, source lines (not shown) used as signal lines, and switching elements (not shown) constituted by thin-film transistors, all of which are provided on the surface of the active matrix substrate 2 which is adjacent the liquid crystal layer 30. The gate lines and the source lines are provided in the row and column directions. Two gate lines and two source lines define one pixel including one pixel electrode 3. The switching elements are provided on the intersection of the gate lines and the source lines. Furthermore, an alignment film 31 is provided on the active matrix substrate 2 to cover the pixel electrodes 3 and the like.

Figure 2A:
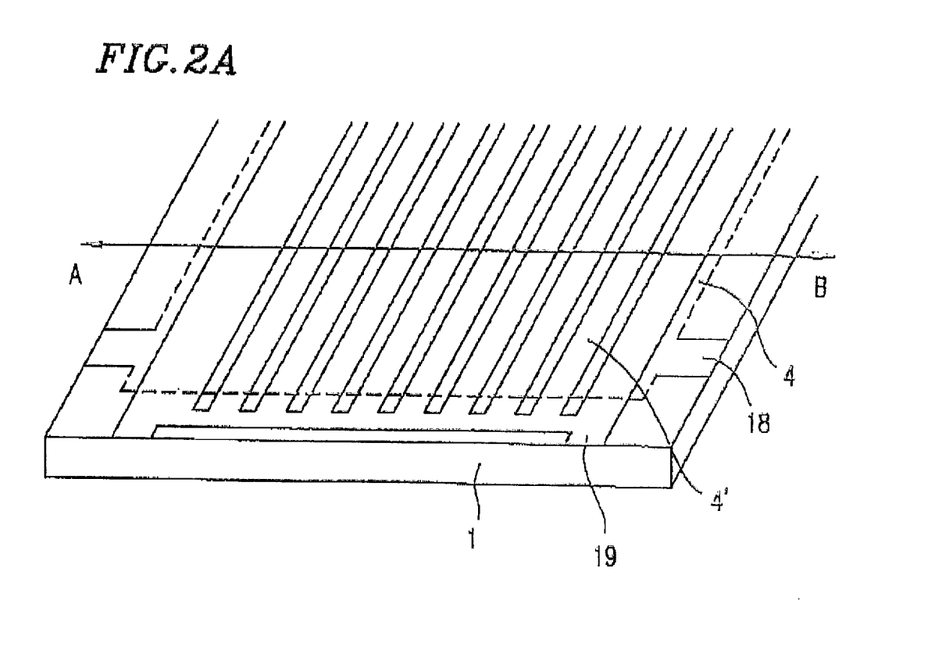
FIG. 2A is a perspective view showing a structure in which a uniform electrode and strip-shaped electrodes are provided on a counter substrate according to Example 1 of the present invention.
Figure 2B:
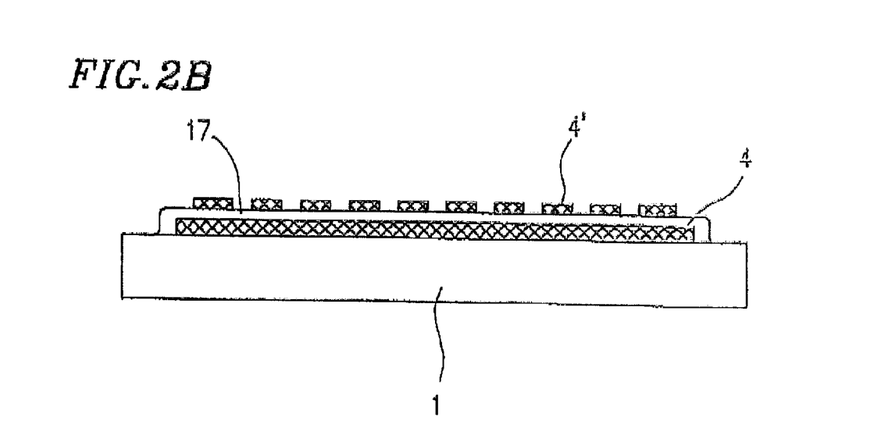
FIG. 2B is a cross-sectional view taken along line A-B of FIG. 2A.

The counter substrate 1 includes a uniform electrode 4, an insulating film 17, a plurality of strip-shaped electrodes 4', and an alignment film 32, all of which are provided in this order on the surface of the counter substrate 1, starting from the substrate 1 side. The configuration of the counter substrate is shown in FIGS. 2A and 2B. FIG. 2A is a perspective view showing a counter substrate (an alignment film is omitted.). FIG. 2B is a cross-sectional view taken along a line A-B of FIG. 2A. The uniform electrode 4 is formed substantially on the entire surface of the counter substrate 1. On the uniform electrode 4, the strip-shaped electrodes 4' are formed with the insulating film 17 interposed therebetween. The insulating film 17 can be any of an inorganic insulating film and an organic insulating film. As for an organic insulating film, a color filter can be used.

Each of the strip-shaped electrodes 4' is provided along the whole length of each column of the pixel electrodes 3. All the strip-shaped electrodes 4' are electrically connected to each other at both ends thereof along the direction of the length, and are connected to a terminal provided to establish external connection. Each of the strip-shaped electrodes 4' have a width equal to or smaller than that of the pixel electrodes 3. The uniform electrode 4 and the strip-shaped electrodes 4' are made of transparent conductive films including inorganic transparent conductive films such as ITO, $In_2O_3$, $SnO_2$ or organic transparent conductive films. Furthermore, on the counter substrate 1 in the above-mentioned structure, the alignment film 32 (see FIG. 3) is provided.

The uniform electrode 4 and the strip-shaped electrodes 4' are connected to a switch 22 (see FIG. 1) via terminals 18 and 19 shown in FIG. 2A, By switching the switch 22, a voltage is applied to only one of the uniform electrode 4 and the strip-shaped electrodes 4'.

Figure 3:
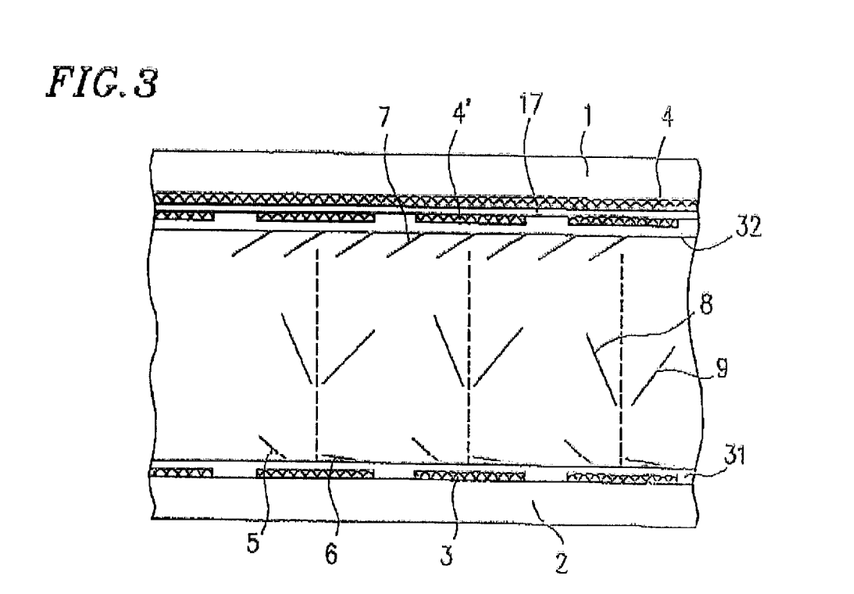
FIG. 3 is a diagram showing the long axis direction of liquid crystal molecules located in the center of a liquid crystal layer in the case where the liquid crystal molecules adjacent alignment layers have small, middle and large pretilt angles.

As shown in FIG. 3, an aligning treatment is performed for the alignment film 31 provided on the active matrix substrate 2 and the alignment film 32 provided on the counter substrate 1. More specifically, the alignment film 32 on the counter substrate 1 is subjected to the aligning treatment so as to impart a certain pretilt angle to liquid crystal molecules which are in contact with the alignment film 32. On the other hand, the alignment film 31 on the actives matrix substrate 2 is subjected to the aligning treatment so as to impart a pretilt angle larger than that of the alignment film 32 to the liquid crystal molecules adjacent the alignment film 31 in some regions and a pretilt angle smaller than that of the alignment film 32 to the liquid crystal molecules adjacent the alignment film 31 in the other regions. The regions for a larger pretilt angle and the regions for a smaller pretilt angle are arranged on the alignment film 31 in a predetermined manner.

In the present example, the alignment film 31 is subjected to the aligning treatment so that a region 5 for a larger pretilt angle and a region 6 for a smaller pretilt angle are formed in each pixel, as shown in FIG. 3. On the other hand, the aligning treatment is performed for the alignment film 32 so that a region, which corresponds to a display region for conducting display constituted by pixels, becomes a region 7 where the liquid crystal molecules adjacent the alignment film 32 have a medium pretilt angle between the large pretilt angle of the regions 5 and the smaller pretilt angle of the regions 6.

The regions for making the liquid crystal molecules adjacent the alignment film 31 different can be formed by varying the surface conditions of the alignment film 31 for the respective region. More specifically, when the surface conditions of a film underlying the alignment film 31 is varied for regions corresponding to the regions 5 and 6 of the alignment film 31, the surface conditions of the alignment film 31 is affected by the underlying film. As a result, regions 5 and 6 can have different surface conditions to provide the liquid crystal molecules with different pretilt angles. Varying the surface conditions of the film underlying the alignment film 31 may be realized, for example, by dry etching the underlying film, or by forming the underlying film to include portions made of different materials.

Alternatively, the surface conditions of the respective regions of the alignment film 31 may be varied by irradiating the alignment film 31 with light under different conditions for the respective regions. In this case, the irradiation of ultraviolet rays or infrared rays is selectively performed, or the irradiation time is made different for the respective regions.

In the present example, the alignment film 32 is subjected to the aligning treatment to have a uniform surface condition, so as to provide the liquid crystal molecules with a uniform pretilt angle, as shown in FIG. 3. However, the alignment film 32 may be formed to have a plurality of regions for realizing different pretilt angles in a similar manner to the alignment film 31.

Under the alignment condition as described above, the liquid crystal layer 30 includes two liquid crystal regions by adding chiral dopant to the liquid crystal material, as shown in FIG. 3. In one liquid crystal region, the liquid crystal molecules adjacent the alignment film 31 on the active matrix substrate 2 have a larger pretilt angle than that of the liquid crystal molecules adjacent the alignment film 32 on the counter substrate 1. Thus, the orientation 8 of the liquid crystal molecules located in the center or the liquid crystal layer along the thickness direction is determined by a direction in which the liquid crystal molecules adjacent the alignment film 31 are aligned. On the other hand, in regards to the other liquid crystal region, the pretilt angle of the liquid crystal molecules adjacent the alignment film 32 is larger than that of the liquid crystal molecules adjacent the alignment film 31. Therefore, the orientation 9 of the liquid crystal molecules in the center of the liquid crystal layer is determined by the aligning direction of the liquid crystal molecules at the alignment film 32. In this example, the liquid crystal material ZLI-4792 available from Merck Ltd. with chiral dopant R-811 having a right-handed twisting force added thereto is used.

In this way, the orientation of the liquid crystal molecules in the center of the liquid crystal layer are different depending on the relationship of the pretilt angle between the substrates 1 and 2. Since the orientation determines the viewing direction in which an observer can be shown a displayed image with optimal contrast, the liquid crystal display apparatus having the two different orientation as described above can have two viewing directions. Therefore, a wide viewing angle can be obtained.

Figure 4:
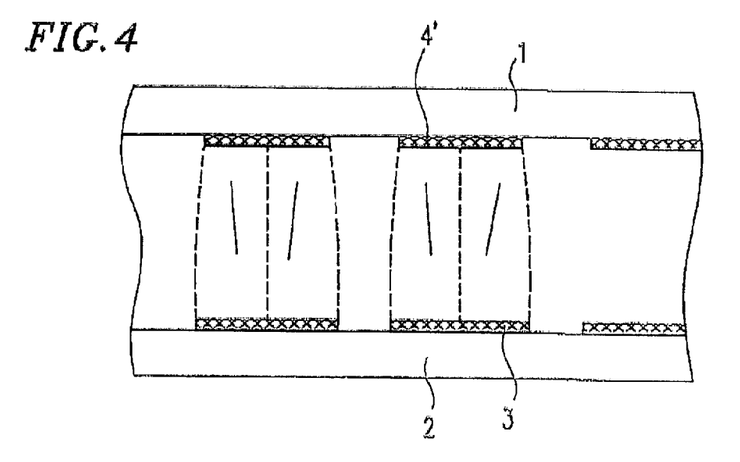
FIG. 4 is a diagram showing electric lines of force between the pixel electrodes and the counter electrodes in the case where the strip-shaped electrodes are used as counter electrodes according to Example 1 of the present invention.

As described above, the liquid crystal display apparatus of this example is designed with the purpose of providing a wide viewing angle. In addition, in the liquid crystal display apparatus of this example, either the uniform electrode 4 or the strip-shaped electrodes 4' are used for applying a voltage to the liquid crystal layer using the switch 22. When a voltage is applied using the strip-shaped electrodes 4', the orientation of the liquid crystal molecules may be changed in portions of the liquid crystal layer which are sandwiched between the strip-shaped electrodes 4' and the pixel electrodes 3, as shown in FIG. 4. Because of the shape of the electrodes 4', the intervals between the electric lines of force indicated by the broken lines are small, and therefore the liquid crystal molecules in the center of the liquid crystal layer 30 are tilted at a large angle. As a results a narrow viewing angle is provided.

Figure 5:
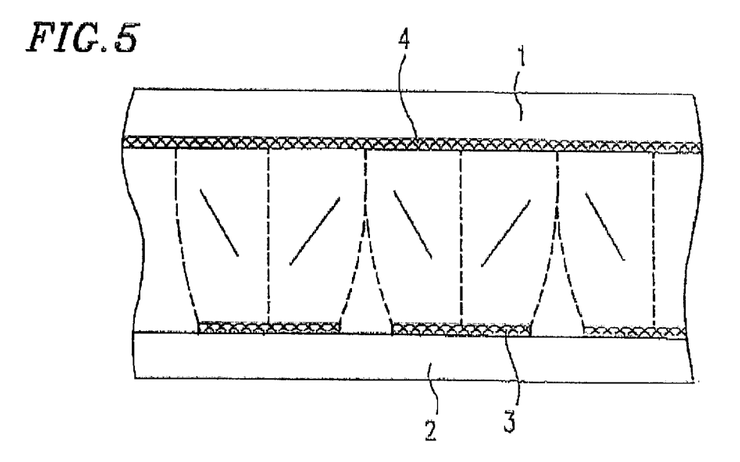
FIG. 5 is a diagram showing the lines of electric force between the pixel electrodes and the counter electrode in the case where the uniform electrode is used as the counter electrode according to Example 1 of the present invention.

On the other hand, when a voltage is applied to the uniform electrode 4, as shown in FIG. 5, the orientation of the liquid crystal molecules may be changed in portions which are sandwiched between the uniform electrode 4 and the pixel electrodes 3. In this case, each portion in which the orientations of the liquid crystal molecules are changed is wider than that in the case of using the strip-shaped electrode 4'. That is, the intervals between the lines of electric force are larger. Because of this, the influence of the electric field on the orientations of the liquid crystal molecules is weaker as compared with the case where a voltage is applied to the strip-shaped electrodes 4', and the liquid crystal molecules in the center of the liquid crystal layer 30 are tilted at a relatively small angle. Accordingly, in the liquid crystal display apparatus of this example, a wide viewing angle can be obtained.

When either one of the uniform electrode 4 or the strip-shaped electrodes 4' is used, the orientation of the liquid crystal molecules of the liquid crystal regions of the liquid crystal layer 30 are kept different to realize a plurality of different viewing directions. Therefore, even when a voltage is applied to the strip-shaped electrodes 4' to obtain a narrow viewing angle, the deterioration of the contrast can be suppressed. Obviously, when the display mode is switched into the wide viewing angle mode using the uniform electrode 4, a wider viewing angle property can be obtained compared to that obtained in the conventional liquid crystal display apparatus.

When a color filter is used, it way be interposed between the counter substrate 1 and the uniform electrode 4. Alternatively, it may be disposed on the strip-shaped electrodes 4'. Alternatively, it may be disposed on the active matrix substrate 2. In any case, it is necessary that the uniform electrode 4 and the strip-shaped electrodes 4' are electrically insulated from each other.

EXAMPLE 2

Figure 6:
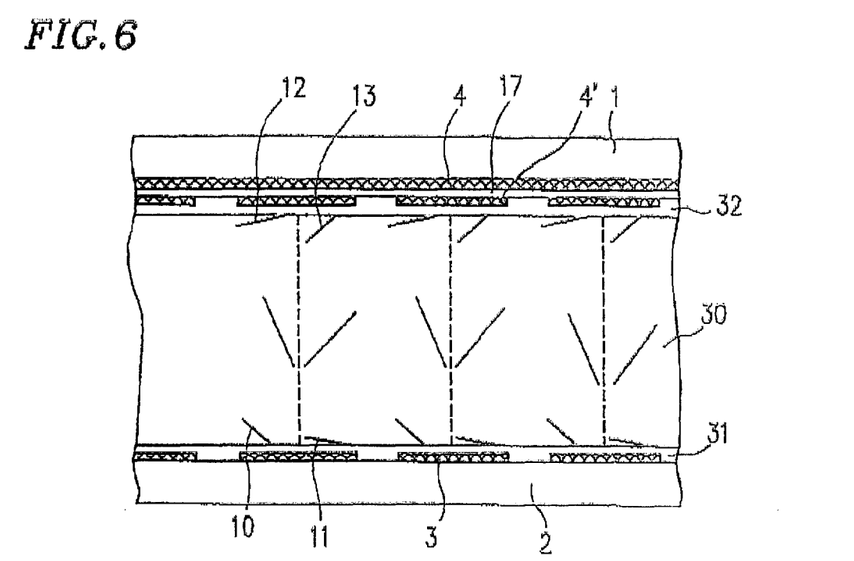
FIG. 6 is a cross-sectional view showing a liquid crystal display apparatus according to Example 2 of the present invention.

FIG. 6 is a cross-sectional view showing a liquid crystal display device according to Example 2 of the present invention.

In Example 2, the liquid crystal display apparatus is designed in another manner to obtain a wide viewing angle. More specifically, for each of the pixels on an active matrix substrate 2, regions 10 for a larger pretilt angle of the liquid crystal molecules and regions 11 for a smaller pretilt angle or the liquid crystal molecules are provided. On a counter substrate 1, regions 12 for a smaller pretilt angle and regions 13 for a larger pretilt angle are provided. The liquid crystal molecules in regions 12 and 13 are tilted so as to have the magnitude of the pretilt angle respectively smaller or larger to that of the liquid crystal molecules in regions 10 and 11.

The magnitude of the pretilt angle is controlled by using different surface conditions of the film underlying the alignment films far the respective regions. Alternatively, it is controlled by irradiating light to the alignment films so as to change the property of the alignment films. In Example 2, the same process is employed as that described in Example 1, except for the combination of the regions of the alignment films for realizing the liquid crystal regions in which the orientations of the liquid crystal molecules located in the center of the liquid crystal layer are different.

In Example 2, the aligning treatment is performed for the alignment films 31 and 32 so that the liquid crystal molecules adjacent each alignment film are unidirectionally aligned, while the surface condition of each alignment film (which affects the pretilt angle of the liquid crystal molecules) is varied for regions 10 and 11 (12 and 13), as shown in FIG. 6. Therefore, the orientations of the liquid crystal molecules expand toward both sides from the normal of the liquid crystal panel, thereby providing a wide viewing angle.

EXAMPLE 3

In Example 3, still another structure is employed to obtain a wide viewing angle. Specifically, for each pixel, a plurality of regions having different alignment directions (i.e., directions in which the liquid crystal molecules in contact with the alignment film are aligned) from each other are provided on one of the substrates. Also, a plurality of regions hating alignment directions different from each other are provided on the other substrate.

Figure 7:
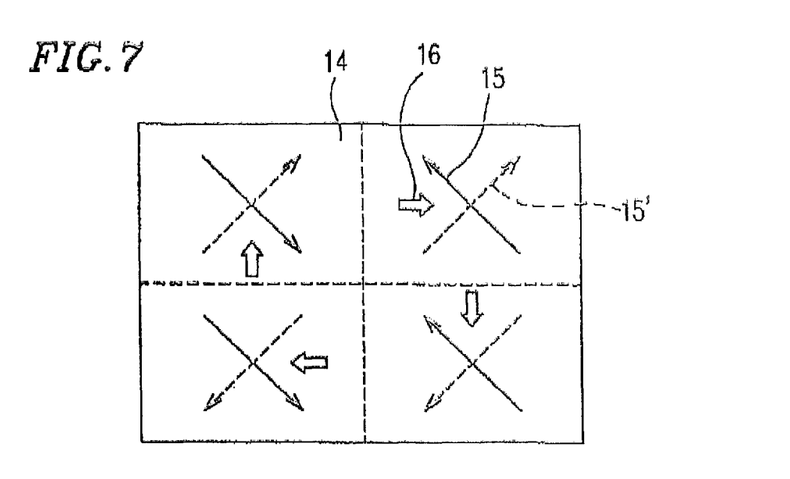
FIG. 7 is a diagram showing the liquid crystal display apparatus of Example 3, illustrating the rubbing directions of the substrates and the viewing directions in the case where the substrates are rubbed to have a plurality of rubbing directions in each pixel.

FIG. 7 is a top view of the liquid, crystal display apparatus in this example corresponding to one pixel. In this example, each pixel 14 is divided into four sub-pixels having different viewing directions from each other. In FIG. 7, the aligning direction of one substrate and the aligning direction of the other substrate are shown by arrows 15 and 15', while the viewing directions are shown by arrows 16. As is described above, the liquid crystal layer includes a plurality of liquid crystal regions for providing different viewing directions 16 in each pixel 14. Therefore, a wide viewing angle can be obtained.

In Example 3, the same process as that described in Example 1 is used, except for the orientation condition of the liquid crystal layer for obtaining a wide viewing angle.

EXAMPLE 4

Figure 8:
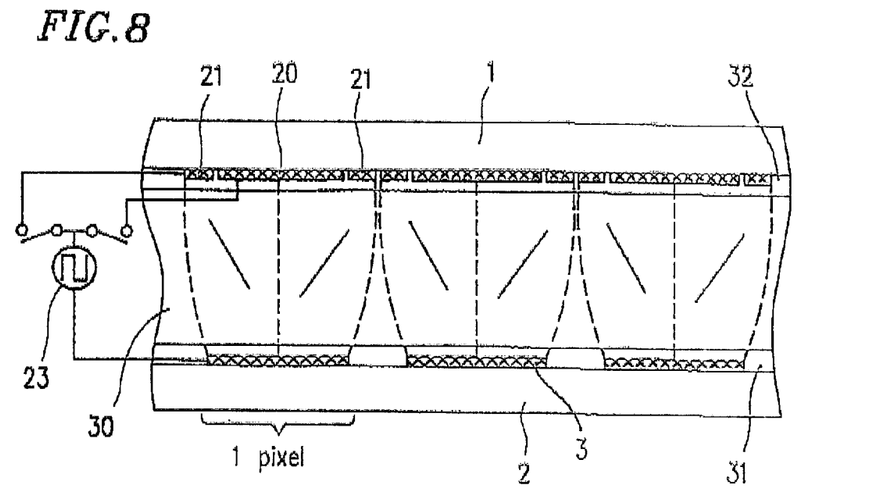
FIG. 8 is a cross-sectional view of the liquid crystal display apparatus of Example 4, illustrating the electric lines of force generated by applying a voltage to two kinds of strip-shaped electrodes.

FIG. 8 is a cross-sectional view showing a liquid crystal display apparatus according to Example 4 of the present invention.

In Examples 1 to 3, the strip-shaped electrodes 4' are located on the uniform electrode 4. However, in Example 4, electrodes used for obtaining a wide viewing angle and electrodes used for obtaining a narrow viewing angle are formed on the identical plane of a counter substrate 1. As shown in FIG. 8, an active matrix substrate 2 is opposed to a counter substrate 1, and pixel electrodes 3 are formed on the active matrix substrate 2. On the surface of the counter substrate 1, the first strip-shaped electrode 20 and two second strip-shaped electrodes 21 are provided for each of the columns of the pixel electrodes 3. Two strip-shaped electrodes 21 are provided so as to sandwich the strip-shaped electrode 20. One strip-shaped electrode 20 and two strip-shaped electrodes 21 sandwiching the electrode 20 are used for applying a voltage to the liquid crystal layer corresponding to a column of pixels. In other words, the voltage application of the liquid crystal layer corresponding to one pixel is performed by the pixel electrode 3, the first electrode 20 and two second electrodes 21, as shown in FIG. 8. In addition, the first strip-shaped electrodes 20 and the second strip-shaped electrodes 21 are formed of a transparent conductive material as in Example 1. The second strip-shaped electrodes 21 disposed on both sides of the first strip-shaped electrode 20 may be formed to have the same shape, i.e., have the same length and the same width.

In this example, the aligning condition of the alignment films 32 and 31 formed on the surface of the substrates 1 and 2 may be any of those described in Examples 1 to 3.

The first strip-shaped electrodes 20 are used both for a wide viewing angle and for a narrow viewing angle, whereas the second strip-shaped electrodes 21 are used only for the wide viewing angle. The first strip-shaped electrodes 20 and the second strip-shaped electrodes 21 are connected to a predetermined terminal of a switch 23. By switching the switch 23, a voltage is selectively applied either to the first strip-shaped electrode 20 only or both the first strip-shaped electrode 20 and the second strip-shaped electrodes 21.

Figure 9:
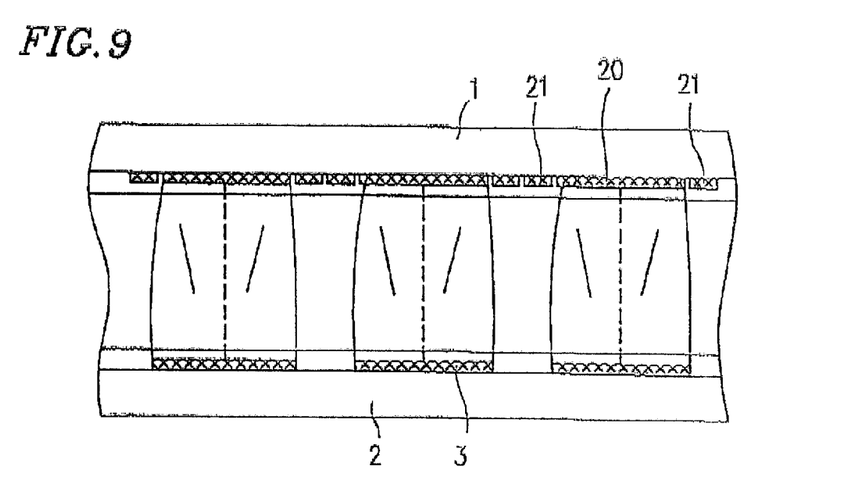
FIG. 9 is a cross-sectional view of the liquid crystal display apparatus of Example 4, illustrating the electric lines of force generated by applying a voltage to one of two kinds of strip-shaped electrodes.

When the switch 23 is switched so that a voltage is applied to both the first strip-shaped electrode 20 and the second strip-shaped electrodes 21, as shown by a broken line in FIG. 8, the intervals between the lines of electric force are large. As a result, the liquid crystal molecules in the center of the liquid crystal layer are tilted at a slow angle, thereby providing a wider viewing angle. On the other hand, when the switch 23 is switched so that a voltage is applied only to the first strip-shaped electrode 20, the intervals between the lines of electric force are narrow as shown in FIG. 9. At this time, the liquid crystal molecules in the center of the liquid crystal layer assume substantially vertical position with respect to the strip-shaped electrodes 20 and 21 under the influence of the electric forces. As a result, a narrower viewing angle is provided.

In Example 4, when a color filter is used, the first strip-shaped electrode 20 and the second strip-shaped electrodes 21 may be provided on or under the color filter.

Moreover, in Example 4, since the structure in which different types of counter electrodes are formed on an identical surface, the liquid crystal panel of this example can be used as a duty liquid crystal panel.

In the above description, whereas the different viewing directions are provided in one pixel, the present invention is not limited thereto. Alternatively, the different viewing directions can be provided in 2 or more pixels.

As described above, according to the present invention, the display mode can be switched between a wide viewing angle mode and a narrow viewing angle mode. In the narrow viewing angle mode, since the liquid crystal molecules in the liquid crystal layer are oriented so as to give a wide viewing angle property, the deterioration of the contrast can be suppressed. On the other hand, in the wide viewing angle mods, the wider viewing angle property can be provided. Accordingly, the display mode can be selectively switched between the wide viewing angle mode which provides a wider viewing angle and the narrow viewing angle mode which provides more excellent contrast in one liquid crystal display apparatus.

By switching the display mode into a narrow viewing angle mode, it is possible to display private information, or display and input information or data desired not to be seen by others. On the other hand, when the display mode is switched into a wide viewing angle mode, the liquid crystal display apparatus can be used for the normal application, or the display screen can be seen by a plurality of persons together.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus for conducting display in at least two display modes using a plurality of pixels arranged in columns and rows, the apparatus comprising:

an active matrix substrate having a plurality of pixel electrodes arranged in a matrix formed thereon;

a counter substrate opposed to the active matrix substrate, the counter substrate having a first electrode means and a second electrode means; and a liquid crystal layer interposed the active matrix substrate and the counter substrate, the liquid crystal layer including a plurality of liquid crystal regions, wherein the liquid crystal regions have viewing directions different form each other, the viewing directions being determined in accordance with orientations of liquid crystal molecules in the center of the respective liquid crystal regions along the thickness direction, and wherein the display has a first and second display mode with different viewing angles, wherein at least one of the first electrode means and the second electrode means, which is selected depending on the display mode, is used for selectively applying a voltage to the liquid crystal layer together with the pixel electrodes.

2. A liquid crystal display apparatus according to claim 1, wherein the first electrode means and the second electrode means are formed of a transparent conductive film to have different shapes from each other, while being insulated from each other.

3. A liquid crystal display apparatus according to claim 2, wherein the first electrode means includes a uniform electrode formed at least over a region of the counter substrate which corresponds to a region where the pixels are arranged, and the second electrode means includes a plurality of strip-shaped electrodes, each of the plurality of strip-shaped electrodes having a width equal to or smaller than a width of each of the pixel electrodes.

4. A liquid crystal display apparatus according to claim 1, further comprising a switching means for selecting either one of the first electrode means and the second electrode means so that voltage is applied only to the selected one.

5. A liquid crystal display apparatus according to claim 1, further comprising a switching means for switching two states, one of the two states being a state in which voltage is applied only to the first electrode means, the other of the two states being a state in which voltage is applied both to the first electrode means and the second electrode means.

6. A liquid crystal display apparatus according to claim 5, wherein the first electrode means includes a plurality of first strip-shaped electrodes, and the second electrode means includes a plurality of second strip-shaped electrodes, the first and second strip-shaped electrode extending along the columns of the pixels, at least one of the first strip-shaped electrodes and at least one of the second strip-shaped electrodes being arranged to correspond to each of the columns of the pixels.

7. A liquid crystal display apparatus according to claim 6, wherein each of the first strip-shaped electrodes is disposed to be sandwiched by two of the second strip-shaped electrodes, the each of the first strip-shaped electrodes and the two of the second strip-shaped electrodes being arranged to correspond to at least one of the columns of the pixels.

8. A liquid crystal display apparatus according to claim 7, wherein both of the second strip-shaped electrodes sandwiching each of the first strip-shaped electrodes have the same size, and are formed of a transparent conductive material.

9. A liquid crystal display apparatus according to claim 1, further comprising a first alignment film formed on one of the active matrix substrate and the counter substrate and a second alignment film formed on the other substrate, wherein the first alignment film provides a first pretilt angle for liquid crystal molecules which are adjacent the first alignment film, and wherein the second alignment film provides liquid crystal molecules which are adjacent the second alignment film with a second pretilt angle in at least one of the liquid crystal regions and with a third pretilt angle in the other of the liquid crystal regions, the second pretilt angle being larger than the first pretilt angle, the third pretilt angle being smaller than the first pretilt angle.

10. A liquid crystal display apparatus according to claim 1, further comprising a first alignment film formed on one of the active matrix substrate and the counter substrate and a second alignment film formed on the other substrate, wherein each of the first alignment film and the second alignment film includes a first portion for a larger pretilt angle and a second portion for a smaller pretilt angle, the active matrix substrate and the counter substrate are arranged so that the first portion of the first alignment film opposes the second portion of the second alignment film and the second portion of the first alignment film opposes the first portion of the second alignment film.

11. A liquid crystal display apparatus according to claim 1, wherein each of the pixels includes more than one of the liquid crystal regions to have more than one different viewing directions.

* * * * *